Patented Oct. 13, 1953

2,655,500

UNITED STATES PATENT OFFICE 2,655,500

STEROID KETONE ADDUCTS

Paul E. Marlatt, Arthur R. Hanze, A Vern McIntosh, Jr., and Robert H. Levin, Kalamazoo, Mich., assignors to The Upjohn Company, Kalamazoo, Mich., a corporation of Michigan No Drawing. Application October 15, 1951, Serial No. 251,452

2 Claims. (Cl. 260—239.55)

The present invention relates to a novel process for the preparation of certain steroid ketone adducts, and to the novel products produced by the said process. This application is a continuation-in-part of our prior-filed applications Serial 187,364, filed September 28, 1950, now Patent No. 2,582,263, and 211,442, filed February 16, 1951, now Patent No. 2,592,586.

The novel compounds of the present invention are 5,7-pregnadien-3,11,20-trione 5,8-maleic adducts of the formula:

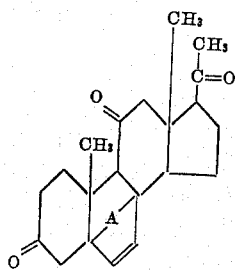

wherein A is the adduct radical of a dienophile selected from the group consisting of maleic acid, maleic anhydride, and lower-alkyl diesters of maleic acid, especially lower-alkyl diesters containing from one to eight carbon atoms, inclusive, in the esterifying groups.

It is an object of the present invention to provide a novel group of compounds which are useful in the preparation of physiologically active steroid compounds containing an oxygen atom at carbon atom eleven. Another object of the invention is the provision of a process for the production of the novel compounds, 5,7-pregnadien-3,11,20-trione 5,8-maleic adducts. Other objects of the invention will be apparent to one skilled in the art to which this invention pertains.

The compounds of the present invention, as previously stated, are useful in the preparation of physiologically active steroid compounds having an oxygen atom attached to carbon atom eleven. Such compounds are of particular interest in the field of steroid research due to the biological activity of the cortical hormones and certain known derivatives thereof, which oxygenated steroids are known to have biological effects differing markedly from the unoxygenated steroids. It is, therefore, of importance to investigate the oxygenated derivatives of such adducts, as well as their transformation products. The importance of such investigation is moreover emphasized by the acute shortage of adrenal cortical hormones, and the absence of any present suggestion for alleviation of the said shortage except through organic synthesis.

Novel compounds of the present invention of particular interest are those compounds of the preceding generic formula wherein the adduct bridge (—A—) is represented by the graphic formula:

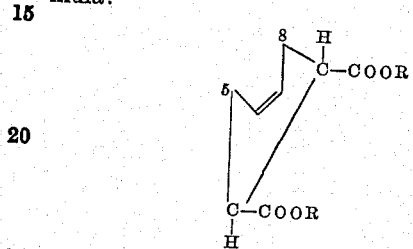

wherein R represents hydrogen or the organic residue of an alcohol. Such esters include the methyl, ethyl, propyl, isopropyl, lauryl, heptyl, octyl, cyclopentyl, cyclohexyl, benzyl, and like esters. The esterifying radical may also contain non-reactive substituents, such as halo, methoxy or hydroxy, if desired. While the esters of the maleic acid adduct are described herein with particular reference to the methyl esters, the preferred embodiment of R is a lower-alkyl radical containing from one to eight carbon atoms, inclusive. Alternatively, the adduct may be represented by the graphic formula:

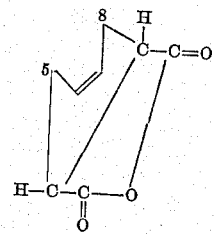

which is representative of the maleic anhydride adduct, which adduct is a preferred embodiment of the invention.

The compounds of the present invention are usually light-colored crystalline solids. The 5,7-pregnadien-3,11,20-trione 5,8-maleic anhydride adduct is readily convertible to the free dibasic acid adduct by hydrolysis and the free dibasic acid adduct can be reconverted to the anhydride by heat in a vacuum. Alternatively, either the anhydride or acid can be converted to a selected diester by treatment with diazomethane, diazoethane, or like diazoalkanes, or by other conventional esterification procedure.

The 5,7-pregnadien-3,11,20-trione 5,8-maleic adducts of the present invention are prepared by the dehalogenation of the corresponding 12-bromo-5,7-pregnadien-3,11,20-trione- 5,8 - maleic adduct. This is conveniently accomplished by heating together the starting 12-bromo-5,7-pregnadien-3,11,20-trione 5,8-maleic adduct and a metal dehalogenating agent in an organic solvent for the reaction, thereafter working up the reaction products and separating the desired 5,7-pregnadien-3,11,20 - trione 5,8 - maleic adduct therefrom. As metal dehalogenating agents may be used any of such known reagents, especially the bivalent metals such as zinc and magnesium, sodium iodide, Raney nickel, especially Raney nickel which has previously been deactivated by reaction with a hydrogen acceptor, such as a carbonyl or ethylenic double bond containing compound, e. g., acetone, and the like. As solvent for the reaction may be employed an organic solvent which is non-reactive under the conditions of reaction, such as acetic acid, acetone, ethyl alcohol, acetamide or the like. Stirring or refluxing should be employed to promote intimate contact of the reactants. When a high-boiling solvent, e. g., acetamide, is employed, stirring is advantageously used rather than reflux, and in all cases high temperatures, e. g., above about 150 degrees centigrade, preferably above about 100 degrees centigrade, are to be avoided for optimum yields and minimum decomposition of starting materials and reaction products, and a temperature of fifty to 100 degrees centigrade is usually entirely satisfactory. Various combinations of metal dehalogenating agent and solvent may be used satisfactorily, including, for example, zinc or magnesium with acetic acid or acetamide, sodium iodide with ethyl or other alcohol, Raney nickel with acetone, and the like. Other advantageous combinations of metal dehalogenating agent and solvent may be used and will be apparent to one skilled in the art. After the reaction is complete, usually in from one-half to two hours, depending somewhat on reagent, solvent and reaction temperature employed, the mixture of reaction products may be worked up according to conventional procedure, e. g., by removing metal dehalogenating agent by filtration and removing solvent under vacuum, dissolving residue in fresh solvent, washing with water, and removing the solvent, which procedure is productive of the desired 5,7-pregnadien-3,11,20-trione 5,8-maleic adduct, usually obtainable as a light-colored solid.

The starting 12-bromo-5,7-pregnadien-3,11,20-trione 5,8-maleic adducts are prepared by the reaction of hydrogen bromide with a starting 9-hydroxy - 5,7 - pregnadien - 3,11,20 - trione 5,8 - maleic acid monoalkyl ester adduct 9-hydroxy lactone of the formula:

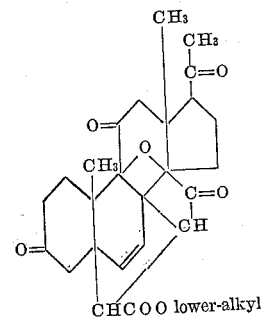

to cause splitting of the lactone linkage at carbon number 9, and separating the products of the reaction. The reaction is preferably conducted at about room temperature or below. Such procedure is productive of the 12-bromo-5,7-pregnadien-3,11,20-trione 5,8-maleic acid adduct, which is of course converted in situ to the anhydride adduct. The anhydride may be reconverted to the acid by mixing with water or dilute acid solution. The acid or anhydride may alternatively be converted to diester adducts by suspending in an organic solvent and adding thereto a solution of a diazoalkane, e. g., diazomethane, diazoethane, diazopropane, or the like, or by other equivalent esterification procedure.

A convenient manner of preparing the 12-bromo-5,7-pregnadien-3,11,20-trione 5,8-maleic anhydride adduct involves dissolving the 9-hydroxy-5,7-pregnadien - 3,11,20 - trione 5,8-maleic acid monoalkyl ester adduct 9-hydroxy lactone in an organic solvent, e. g., chloroform, diluting the solution with acetic anhydride, introducing the solution into a Carius tube and cooling to below zero degrees centigrade, e. g., to about minus eighty degrees centigrade, and preferably between about minus twenty and minus eighty degrees centigrade. An excess of hydrogen bromide is then introduced into the tube, the tube sealed and allowed to rise to room temperature in a protective iron pipe. After a period of from a few minutes to twenty-four hours at room temperature or thereabout, the tube is cooled again to below zero, opened, and the reaction products worked up in conventional manner, as by pouring on ice, extracting the product from the water solution with chloroform, and removing the chloroform under vacuum. This procedure is productive of the maleic anhydride adduct, which can be converted to the maleic acid or ester adducts as pointed out supra. If instead of extracting with chloroform and evaporating to dryness, the water solution is acidified slightly, the maleic acid adduct precipitates therefrom upon refrigeration.

Other procedure for the reaction between the 5,7-pregnadien-3,11,20-trione 5,8 - maleic acid monoalkyl ester adduct 9-hydroxy lactone and the hydrogen bromide may be employed, procedure known to the art for replacement of hydrogen or bromine using such type of reaction and employing mild reaction conditions being satisfactory.

The 9-hydroxy-5,7-pregnadien-3,11,20-trione 5,8-maleic adduct 9-hydroxy lactones are prepared by the oxidation of a 3,9,11-trihydroxy-5,7-pregnadien-20-one 5,8-maleic acid adduct 9-hydroxy lactone or 5,8-maleic ester adduct 9-hydroxy lactone to convert the hydroxy groups at carbon atoms 3 and 11 therein to ketone groups. This is accomplished by mixing the starting adduct with chromic acid in the approximate proportion of about one mole of starting adduct to two moles of chromic acid. The chromic acid is advantageously added portionwise to a glacial acetic acid solution of the adduct and this is preferably accomplished by dissolving approximately two molar proportions of chromium trioxide in a minimum amount of water, diluting the chromic acid solution with glacial acetic acid, and adding the glacial acetic acid solution of chromic acid to the glacial acetic acid solution of the starting adduct. Other modes of admixture are satisfactory, however, and will be apparent to one skilled in the art. The oxidation may be conducted by allowing the reactants to stand together at room temperature or below, or gentle heating may be applied if necessary, though with caution. Stirring of the reaction mixture may also be employed to advantage in some cases to promote more intimate contact of reactants. A reaction period of one to five hours is usually satisfactory, although shorter or longer periods may sometimes be employed, if desired. Upon completion of the reaction, excess chromium trioxide and/or chromic acid may be destroyed by addition of alcohol, the mixture of reaction products poured into an ice and water mixture, the water solution extracted with an organic solvent, e. g., methylene chloride, and the solvent solution worked up according to conventional procedure to obtain the desired triketone product.

The 3,9,11-trihydroxy-5,7-pregnadien-20-one 5,8-maleic adduct 9-hydroxy lactones are prepared by the lactonization of a 3,9,11-trihydroxy-5,7-pregnadien-20-one maleic 5,8-adduct of the formula:

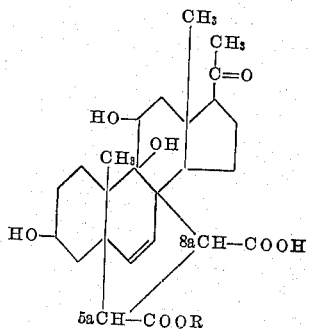

wherein R is hydrogen or a lower-alkyl radical, especially a lower-alkyl radical containing from one to eight carbon atoms, inclusive, by dehydrating the starting 3,9,11-trihydroxy adduct to cause splitting out of one molecule of water between the 8a-carboxy group and the 9-hydroxy group with consequent production of a 9-hydroxy lactone. The dehydration may be effected by heating the starting adduct, preferably, though not necessarily in an anhydrous organic solvent. Alternatively, the dehydration may be effected by mixing the starting adduct with the anhydride of an organic acid, preferably an aliphatic acid such as formic, acetic, propionic, butyric, octanoic, or benzoic acid, or the like, and preferably, though not necessarily, in the presence of a small amount of basic catalyst such as anhydrous pyridine. As still a further method of effecting the dehydration, the starting adduct may be mixed with a lower-aliphatic alcohol, e. g., an alkanol such as methyl alcohol, ethyl alcohol, propyl alcohol, isopropyl alcohol, n-octyl alcohol, or benzyl alcohol, or the like. The aforementioned substances, i. e., alcohols or anhydrides, apparently have sufficient hygroscopicity to take up one molecule of water from the starting adduct, with consequent formation of the desired lactone, even though merely allowed to stand in admixture with the starting adduct at room temperature or lower, without heating. Of course, it is usually preferred to employ heating to effect the dehydration as this is the most simple procedure. The lactone of the maleic acid adduct may be esterified by conventional procedure, e. g., by reaction with a diazoalkane such as diazomethane, diazoethane, diazobutane, or the like, or even with employment of an excess of alcohol in the same reaction which is productive of the lactone from the 9-hydroxy maleic acid adduct. Thus, a 3,9,11-trihydroxy maleic acid adduct may be converted to a 3,11-dihydroxy lactone acid by heating, or to a 3,11-dihydroxy lactone acid ester by reaction with an excess of an anhydrous alcohol, such as those mentioned supra for closing of the ring.

The 3,9,11-trihydroxy-5,7-pregnadien-20-one maleic acid 5,8-adduct is obtained from a 3,9,11-triacyloxy-5,7-pregnadien-20-one maleic anhydride adduct by careful saponification with about five molar equivalents of a suitable alkali metal base and neutralization with an aqueous mineral acid, as more fully set out in U. S. application Serial 211,442, filed February 16, 1951, and the monoalkyl esters thereof are obtained therefrom in conventional manner, as more fully disclosed hereinafter.

These 3,9,11-triacyloxy-5,7-pregnadien-20-one adducts are obtained by acylation of a 3-hydroxy or 3-acyloxy-9,11-oxido-5,7-pregnadien-20-one maleic adduct, as more fully set out in U. S. application Serial 187,364, filed September 28, 1950.

The 3-substituted-9,11-oxido-5,7-pregnadien-20-one adducts are prepared by epoxidation of the 9,11-double bond of a 3-substituted-5,7,9(11)-pregnatrien-20-one adduct, as more fully disclosed in U. S. application Serial 177,966, filed August 5, 1950.

The 3-substituted-5,7,9(11)-pregnatrien-20-one adducts are conveniently prepared by the selective oxidation of a 22-enol ester of an adduct of 3-acyloxybisnor-5,7,9(11)-cholatrien-22-al, as more fully disclosed in U. S. application Serial 121,224, filed October 13, 1949.

Adducts of 3,22-diacyloxybisnor-5,7,9(11),20-(22)-cholatetraenes [22-enol esters of 3-acyloxy-bisnor-5,7,9(11)-cholatrien-22-als] are conveniently prepared by subjecting an adduct of a 3-acyloxybisnor-5,7,9(11)-cholatrien-22-al to the action of an acid anhydride or an acid halide in the presence of an alkaline salt of the acid, as more fully disclosed in U. S. application Serial 111,974, filed August 23, 1949.

The starting adducts of 3-acyloxybisnor-5,7,-9(11)-cholatrien-22-als can be prepared from adducts of 3-esters of dehydroergosterol by selective oxidation as more fully disclosed in U. S. application Serial 111,100, filed August 18, 1949.

The following examples are illustrative of the process and products of the present invention, but are not to be construed as limiting.

PREPARATION 1.—DIMETHYL MALEATE ADDUCT OF 3-BETA-ACETOXY-9,11-OXIDO 5,7-PREGNADIEN-20-ONE

One gram (0.002 mole) of the dimethyl maleate adduct of 3-beta-acetoxy-5,7,9(11)-pregnatrien-20-one was dissolved in 25 milliliters of glacial acetic acid, and a solution of one milliliter of thirty percent hydrogen peroxide (four molar equivalents) in six milliliters of glacial acetic acid was added thereto at room temperature. The reaction mixture was heated on the steam bath for four hours and thereafter allowed to stand at room temperature overnight. The mixture was then poured into 300 milliliters of water, the resulting precipitate separated by filtration, washed with water, and dried. The yield was 810 milligrams of the oxido compound melting at 197–206 degrees centigrade. After five recrystallizations from methanol and acetone-hexane, the dimethyl maleate adduct of 3-beta-acetoxy - 9,11 - oxido - 5,7 - pregnadien - 20 - one melted at 216–221 degrees centigrade, (alpha)-$_D^{26}$+11.4 degrees (chloroform).

Analysis:
Calculated ------ percent C, 67.68; percent H, 7.44
Found ---------- percent C, 67.74; percent H, 7.35
                 68.02;             7.40

PREPARATION 2.—MALEIC ANHYDRIDE ADDUCT OF 3-BETA-ACETOXY-9,11-OXIDO-5,7-PREGNADIEN-20-ONE

Five grams (0.011 mole) of the maleic anhydride adduct of 3-beta-acetoxy-5,7,9(11)-pregnatrien-20-one was dissolved in 120 milliliters of hot glacial acetic acid, the solution thereafter cooled to room temperature, and a solution of five milliliters of thirty percent hydrogen peroxide (four molar equivalents) in thirty milliliters of glacial acetic acid added dropwise thereto with swirling. The reaction mixture was heated on the steam bath for three and one-half hours. The colorless solution was allowed to stand at room temperature overnight, poured into about one liter of water, the resulting precipitate separated by filtration, washed with water, and dried in a vacuum desiccator. The yield was 4.88 grams (94.8 percent), melting at 232–246 degrees centigrade. After two recrystallizations from acetone, crystals of the maleic anhydride adduct of 3-beta-acetoxy-9,11-oxido-5,7-pregnadien-20-one, melting at 240–246 degrees centigrade, were obtained.

Analysis:
Calculated ------ percent C, 69.21; percent H, 6.89
Found ---------- percent C, 69.43; percent H, 6.94
                 69.30;             6.97

PREPARATION 3.—MALEIC ANHYDRIDE ADDUCT OF 3-BETA-ACETOXY-9,11-OXIDO-5,7-PREGNADIEN-20-ONE

A solution of fifty grams of the maleic anhydride adduct of 3-beta-acetoxy-5,7,9(11)-pregnatrien-20-one in 1200 milliliters of glacial acetic acid was prepared by heating the ingredients together on a steam bath. The mixture was then cooled to below forty degrees centigrade and fifty milliliters of thirty percent hydrogen peroxide in 300 milliliters of glacial acetic acid added thereto. The mixture was then heated on the steam bath for one hour at a temperature of 85 degrees centigrade or above, and was then poured into three to five volumes of ice and water. The yield was 47.7 grams (92 percent), melting point 238–243 degrees centigrade, (alpha)$_D^{25}$+31.1 degrees (chloroform). The product was dissolved in methylene chloride and precipitated by addition of ether to give 37.7 grams of purified product having a melting point of 254 to 259 degrees centigrade (alpha)$_D^{25}$+33.2 degrees (chloroform).

PREPARATION 4

In the same manner as given above for the preparation of 3 - beta-acetoxy-9,11-oxido-5,7-pregnadien-20-one maleic anhydride adduct, the following compounds were prepared:

(1) Maleic anhydride adduct of 3-benzoyloxy-9,11-oxido-5,7-pregnadien-20-one, M. P. 258–260 degrees centigrade, (alpha)$_D^{26}$ plus 24.4 degrees (chloroform).

Analysis:
Calculated ------ percent C, 72.43; percent H, 6.46
Found ---------- percent C, 72.62; percent H, 6.42
                 72.70;             6.38

(2) Maleic anhydride adduct of 3-heptanoyloxy-9,11-oxido-5,7-pregnadien-20-one, M. P. 168–169.5 degrees centigrade, (alpha)$_D^{26}$ plus 26.1 degrees (chloroform).

Analysis:
Calculated ------ percent C, 71.48; percent H, 7.69
Found ---------- percent C, 71.27; percent H, 7.43
                 71.44;             7.65

PREPARATION 5.—MALEIC ACID ADDUCT OF 3-BETA-HYDROXY-9,11-OXIDO-5,7-PREGNADIEN-20-ONE

Approximately 445 milliliters of five percent sodium hydroxide solution was added to 22.26 grams of 3-beta-acetoxy-9,11-oxido-5,7-pregnadien-20-one maleic anhydride adduct in a one-liter Erlenmeyer flask, and the mixture stirred until the solid had gone into solution. About 185 milliliters of ten percent hydrochloric acid was then added at room temperature or below, until the mixture was acid to Congo red paper, whereupon the hydroxy diacid began to precipitate. Upon cooling the flask overnight, filtering and air-drying the product at room temperature, a yield of 19.4 grams of desired 3-beta-hydroxy-9,11-oxido-5,7-pregnadien-20-one maleic acid adduct, melting at 229–233 degrees centigrade with decomposition, was obtained. An additional crop of crystals was obtained by concentration of the mother liquor.

PREPARATION 6.—MALEIC ANHYDRIDE ADDUCT OF 3-BETA-HYDROXY-9,11-OXIDO-5,7-PREGNADIEN-20-ONE

3 - beta - hydroxy - 9,11 - oxido - 5,7 - pregnadien-20-one maleic acid adduct (19.4 grams) was placed in a vacuum oven and heated for ten hours at 137–140 degrees centigrade under a pressure of only one-half millimeter of mercury. The yield of desired anhydride, which melts at 233 to 240 degrees centigrade with decomposition, was quantitative.

PREPARATION 7.—MONOMETHYL MALEATE OF 3-BETA-HYDROXY-9,11-OXIDO-5,7-PREGNADIEN-20-ONE

A solution of five grams of the maleic anhydride adduct of 3-beta-acetoxy-9,11-oxido-5,7-pregnadien-20-one in 145 milliliters of methanol and a solution of five grams of sodium hydroxide in 25 milliliters of water were mixed and the mixture allowed to stand for one hour, whereafter 145 milliliters of water was added, the mixture allowed to stand for seven hours, then made acid with three normal hydrochloric acid and placed in the refrigerator. The mixture was then extracted with methylene chloride, washed with sodium chloride, and dried over sodium sulfate. The yield was 4.93 grams, melting point 130–160 degrees centigrade. After recrystallization three times from a solution of chloroform, methanol, and ether, the melting point was 193–198 degrees centigrade, (alpha)$_D^{25}$+19.4 degrees (chloroform).

Analysis:
Calculated
  percent C, 68.10; percent H, 7.47; percent OCH$_3$, 6.76
Found
  percent C, 67.90; percent H, 7.14; percent OCH$_3$, 6.22
          67.97;             7.35;                    6.12

PREPARATION 8.—DIMETHYL MALEATE OF 3-BETA-HYDROXY-9,11-OXIDO-5,7-PREGNADIEN-20-ONE

A suspension of 0.65 gram of the monomethyl ester of the maleic acid adduct of 3-beta-hydroxy - 9,11 - oxido - 5,7 - pregnadien - 20- one in twenty milliliters of anhydrous ether was treated with an excess of diazomethane in methylene chloride solution. On addition of methylene chloride the compound went into solution and was allowed to stand about two hours, the solution evaporated to dryness, and the residue dissolved in twelve milliliters of hot ethanol, filtered, concentrated, water added, and the solution placed in the refrigerator. The precipitate was separated by filtration to give a yield of 0.54 gram, melting at 207–211 degrees centigrade. The product was passed over a column of alumina for purification, and this procedure yielded 0.50 gram of product, which upon crystallization from methanol had a melting point of 210–212 degrees centigrade $(alpha)_D^{26}+15.4$ degrees (chloroform).

*Analysis:*
Calculated
 percent C, 68.62; percent H, 7.68; percent $OCH_3$, 13.13
Found
 percent C, 68.62; percent H, 7.61; percent $OCH_3$, 12.10
 68.61; 7.64; 12.22

Infra-red analysis was in agreement with the structure proposed.

PREPARATION 9.—3,9,11-TRIACETOXY-5,7-PREGNADIEN-20-ONE MALEIC ANHYDRIDE ADDUCT

To a one-liter three-neck round-bottom flask equipped with stirrer and thermometer, immersed in an ice-salt bath, were added eight grams of 3 - beta - acetoxy - 9,11 - oxido - 5,7 - pregnadien-20-one maleic anhydride adduct and 400 milliliters of acetic anhydride (Merck reagent grade). After solution was complete and after the inside temperature had dropped to between zero and four degrees centigrade, sixteen drops of anhydrous stannic chloride was added thereto. The reaction was allowed to continue for 45 minutes with stirring, and, at the end of this time, the reaction mixture was poured into three liters of ice and water. The ice and water mixture was stirred until all of the acetic anhydride had hydrolyzed and the product had precipitated as white platelets. The white product was filtered off and dried. The weight was 9.42 grams, M. P. 205–215 degrees centigrade. Two recrystallizations from acetone-isopropyl ether mixture gave 4.2 grams, M. P. 228–234 degrees centigrade (tube), 265–270 degrees centigrade with softening at 235 degrees centigrade (block); $(alpha)_D^{27}$—84.7 degrees (chloroform). The yield was 43 percent.

*Analysis:*
Calculated ----------------- C, 65.24; H, 6.71
Found ------------------- C, 65.26; H, 6.72
                          65.26;    6.72

PREPARATION 10.—3-BENZOYLOXY-9,11-DIACETOXY-5,7-PREGNADIEN-20-ONE MALEIC ANHYDRIDE ADDUCT

In exactly the same manner as given in Preparation 9, this compound is prepared from 3-benzoyloxy - 9,11 - oxido - 5,7 - pregnadien-20-one maleic anhydride adduct (Preparation 4).

PREPARATION 11.—3 - HEPTANOYLOXY-9,11-DIACETOXY-5,7-PREGNADIEN-20-ONE MALEIC ANHYDRIDE ADDUCT

In exactly the same manner as given in Preparation 9, this compound is prepared from 3-heptanoyloxy - 9,11 - oxido - 5,7 - pregnadien-20-one maleic anhydride adduct (Preparation 4).

PREPARATION 12.—3,9,11-TRIACETOXY-5,7-PREGNADIEN-20-ONE DIMETHYL MALEATE ADDUCT

In exactly the same manner as given in Preparation 9, this compound is prepared from 3 - acetoxy - 9,11 - oxido - 5,7 - pregnadien-20-one dimethyl maleate adduct (Preparation 1).

PREPARATION 13.—3 - ACETOXY-9,11-DIPROPIONOXY-5,7-PREGNADIEN-20-ONE MALEIC ANHYDRIDE ADDUCT

In exactly the same manner as given in Preparation 9, this compound is prepared from 3-acetoxy -9,11- oxido -5,7- pregnadien -20- one maleic anhydride adduct using an excess of propionic anhydride and stannic chloride catalyst.

PREPARATION 14.—3,9,11-TRIHYDROXY-5,7-PREGNADIEN-20-ONE MALEIC ACID ADDUCT DISODIUM SALT

The maleic anhydride adduct of 3-beta,9,11-triacetoxy-5,7-pregnadien-20-one (11.05 grams) was dissolved in 200 milliliters of purified dioxane by heating. To this solution was added 250 milliliters of two normal sodium hydroxide solution at room temperature and the mixture diluted with an additional fifty milliliters of water, making approximately a one normal solution of sodium hydroxide. This was allowed to stand at room temperature for two hours, at the end of which time formation of the 3,9,11-trihydroxy-5,7-pregnadien-20-one maleic acid adduct disodium salt was complete. Use of potassium hydroxide in place of sodium hydroxide is productive of the dipotassium salt.

PREPARATION 15.—3,9,11-TRIHYDROXY-5,7-PREGNADIEN-20-ONE-5,8-MALEIC ACID ADDUCT

The reaction mixture from Preparation 14 was partially neutralized by addition of 100 milliliters of three normal hydrochloric acid and then evaporated in vacuo at forty degrees centigrade to a volume of 310 milliliters, thereby removing all dioxane. The reaction mixture was then made acid to Congo red paper by adding eighty milliliters of three normal hydrochloric acid and placed in the refrigerator for several hours. The yield of crude product was 71.5 percent. This was redissolved in forty milliliters of 0.5 normal sodium hydroxide, diluted to 200 milliliters with water, made acid with 45 milliliters of one normal hydrochloric acid, and cooled. The yield was 5.62 grams of white needles, M. P. 255–264 degrees centigrade.

PREPARATION 16.—3,11 - DIACETOXY - 9 - HYDROXY - 5,7-PREGNADIEN-20-ONE 5,8-MALEIC ACID ADDUCT 9-HYDROXY LACTONE

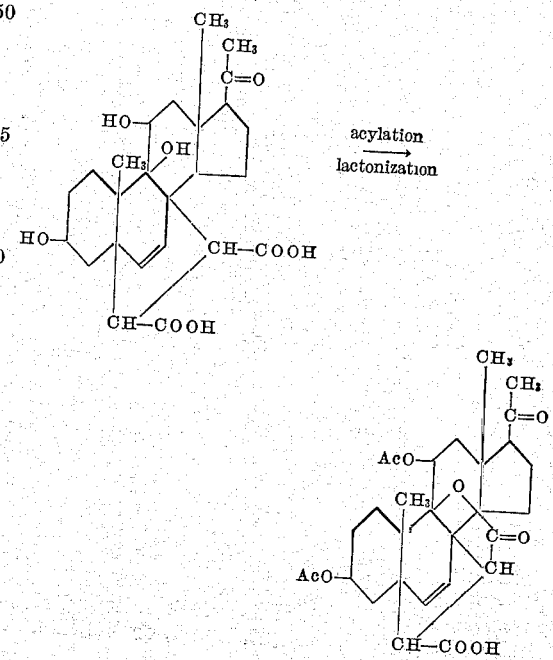

3,9,11-trihydroxy-5,7-pregnadien-20-one 5,8-maleic acid adduct was dissolved in twenty milliliters of acetic anhydride and one drop of dry pyridine was added as catalyst. The solution was allowed to stand at room temperature for fifteen hours. In the process of isolation the product was taken to dryness under vacuum at steam bath temperature (eighty degrees centigrade) and redissolved in an organic solvent. From this solvent an amorphous solid was obtained. Infrared studied on this material established the structure as that of 3,11-diacetoxy-9-hydroxy-5,7-pregnadien-20-one 5,8-maleic acid adduct 9-hydroxy lactone.

PREPARATION 17.—3,9,11-TRIHYDROXY-5,7-PREGNADIEN-20-ONE 5,8-MALEIC ACID ADDUCT 9-HYDROXY LACTONE

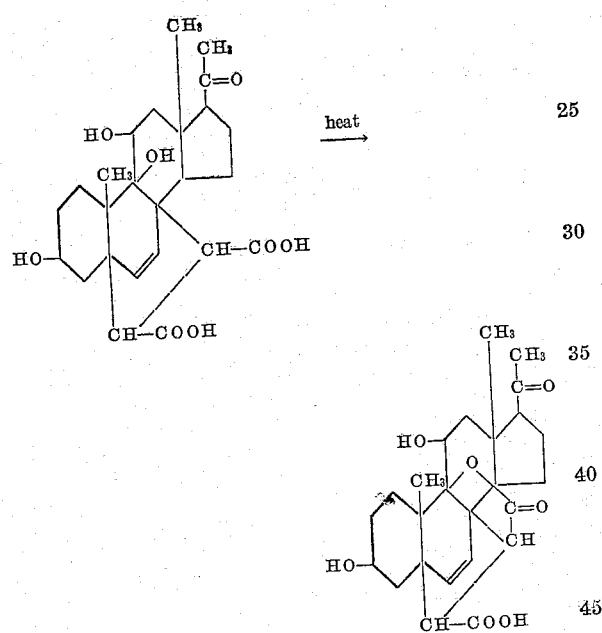

3,9,11-trihydroxy-5,7-pregnadien-20-one 5,8-maleic acid adduct (from Preparation 15) was dissolved in twenty milliliters of anhydrous diethyl ether and the mixture heated at about reflux temperature (35 degrees centigrade) for a period of about two hours. Excess ether was then removed by evaporation and remaining solvent taken off under vacuum, leaving a white solid identified by infra-red spectrum as 3,9,11-trihydroxy-5,7-pregnadien-20-one 5,8-maleic acid adduct 9-hydroxy lactone. The structure of this solid was proved by acetylation with acetyl chloride to give 3,11-diacetoxy-9-hydroxy-5,7-pregnadien-20-one 5,8-maleic acid adduct 9-hydroxy lactone, which had an infra-red spectrum identical with that produced by the same compound obtained in the manner of Preparation 16.

This compound, 3,9,11-trihydroxy-5,7-pregnadien-20-one 5,8-maleic acid adduct 9-hydroxy lactone, can also be converted by conventional procedures to esters thereof by esterification at the carboxy group using a diazoalkane, e. g., diazomethane, diazoethane, diazopropane, diazobutane, or in other conventional manner, such as with an alcohol, e. g., methyl alcohol, ethyl alcohol, propyl alcohol, isopropyl alcohol, butyl alcohol, amyl alcohol, hexyl alcohol, heptyl alcohol, octyl alcohol, benzyl alcohol, or the like.

PREPARATION 18.—3,9,11 TRIHYDROXY-5,7-PREGNADIEN-20-ONE 5,8-MALEIC ACID MONOMETHYL ESTER ADDUCT 9-HYDROXY LACTONE

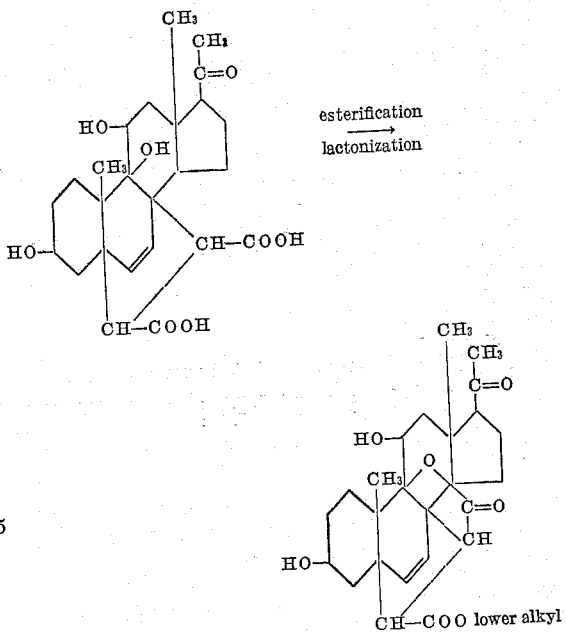

To a solution of 3,9,11-trihydroxy-5,7-pregnadien-20-one 5,8-maleic acid adduct (6.48 grams, 0.014 mole) in 100 milliliters of methanol, immersed in an ice bath, was added portionwise over a period of one-half hour 350 milliliters (an excess) of a methylene chloride solution of diazomethane. The reaction was allowed to stand overnight at room temperature, and excess diazomethane then boiled off on a steam bath under the hood. The remaining solvent was taken off under vacuum, leaving 6.27 grams of a white solid, the infra-red spectrum of which indicated it to be the desired 3,9,11-trihydroxy-5,7-pregnadien-20-one 5,8-maleic acid monomethyl ester adduct 9-hydroxy lactone.

The dehydration may be accomplished in the same manner, by employment of other alkanols, such as ethyl alcohol, propyl alcohol, isopropyl alcohol, butyl alcohol, amyl alcohol, hexyl alcohol, heptyl alcohol, octyl alcohol, or benzyl alcohol, and the like, instead of a methyl alcohol. Likewise, other esterifying agents such as diazoethane, diazopropane, diazobutane, diazooctane, and the like may be used as esterifying agents, or, alternatively, the starting 3,9,11-trihydroxy acid may merely be heated together with the desired alcohol, such as those mentioned above, to effect both esterification and lactonization.

PREPARATION 19.—9-HYDROXY-5,7-PREGNADIEN-3,11,20-TRIONE 5,8-MALEIC ACID ADDUCT 9-HYDROXY LACTONE AND MONOMETHYL ESTER THEREOF

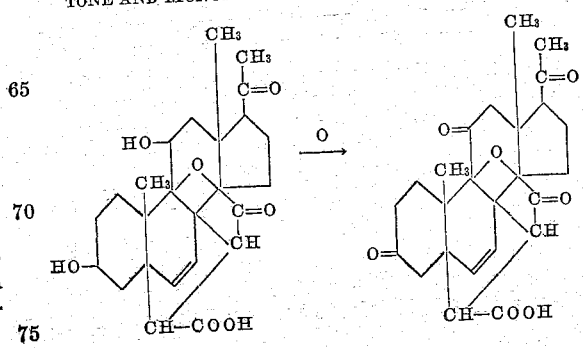

3,9,11-trihydroxy-5,7-pregnadien-20-one 5,8-maleic acid adduct (500 milligrams, 0.001 mole) was dissolved in twenty milliliters of glacial acetic acid and to this solution was added a solution of chromic oxide (220 milligrams, 0.0022 mole) dissolved in five drops of water and diluted with twenty milliliters of glacial acetic acid. The solution was allowed to stand at room temperature for a two-hour period and the excess chromic oxide then destroyed with fifteen milliliters of ethanol. The reaction mixture was poured into ice and water and the water solution extracted three times with 200-milliliter portions of methylene chloride. The solvent was removed under vacuum and the resulting solid dried under vacuum at steam-bath temperature (eighty degrees centigrade). The product was taken up in 0.5 normal sodium hydroxide solution and acidified to Congo red paper with dilute hydrochloric acid. The resulting yellow needles were determined by infra-red study to be a mixture of 9-hydroxy-5,7-pregnadien-3,11,20-trione 5,8-maleic acid adduct and 9-hydroxy-5,7-pregnadien-3,11,20-trione 5,8-maleic acid adduct 9-hydroxy lactone, with the latter predominating.

Methylation of the mixture with diazomethane and subsequent chromatography gave the methyl ester of the lactone in pure form. Recrystallization from methanol gave on analytical sample:

*Analysis:*
Calculated ------- C, percent 68.70; H, percent 6.65; CH₃O, percent 6.82
Found ---------- C, percent 68.62; H, percent 6.51; CH₃O, percent 6.84
                  68.72;

$(alpha)_D^{23}$ +111 (chloroform).

PREPARATION 20.—9-HYDROXY-5,7-PREGNADIEN-3,11,20-TRIONE 5,8-MALEIC ACID MONOMETHYL ESTER ADDUCT 9-HYDROXY LACTONE

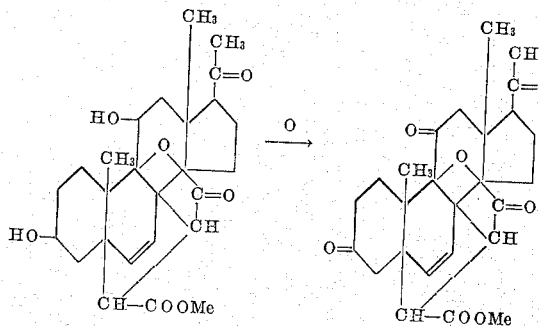

To a solution of 3,9,11-trihydroxy-5,7-pregnadien-20-one 5,8-maleic acid monomethyl ester adduct 9-hydroxy lactone (Preparation 18) (6.27 grams, 0.0137 mole) in 300 milliliters of glacial acetic acid, was added a solution of chromium trioxide (2.6 grams, 0.026 mole) in a minimum amount of water and diluted with seventy milliliters of glacial acetic acid. The oxidation reactants were allowed to stand at room temperature for three hours, at the end of which time 100 milliliters of absolute alcohol was added to eliminate excess chromium trioxide. After standing an additional twenty minutes, the reaction mixture was poured into four liters of ice and water. The water was extracted three times with 500-milliliter portions of methylene chloride. The methylene chloride solution was washed with saturated sodium bicarbonate solution and then with water until the washings were neutral to P-hydrion paper. The solution was then dried over anhydrous sodium sulfate, filtered, and the solvent taken off under vacuum leaving 5.87 grams of a white solid. This solid was taken up in 75 milliliters of methylene chloride and 75 milliliters of methanol added. The solution was then concentrated until prisms began separating from the boiling solution. After cooling the solution to room temperature and allowing it to stand for several hours, 3.46 grams of white prisms were collected, M. P. 285–290 degrees centigrade (block). Further concentration gave the second crop, 1.46 grams, M. P. 288–290 degrees centigrade. The total yield was 4.92 grams.

*Analysis:*
Calculated ------- C, percent 68.70; H, percent 6.65
Found ---------- C, percent 68.62; H, percent 6.51
                  68.72;

$(alpha)_D^{23}$ plus 111 degrees (chloroform).

In like manner, by oxidation of other starting 5,8-maleic acid monoalkyl ester adduct 9-hydroxy lactones, such as the 9-hydroxy lactones of 3,9,11-trihydroxy-5,7-pregnadien-20-one 5,8-maleic acid monoethyl, monopropyl, monoisopropyl, monobutyl, monopentyl, monohexyl, monoheptyl, monooctyl, monobenzyl, or like monoalkyl ester adducts, are prepared the corresponding 9-hydroxy-5,7-pregnadien-3,11,20-trione 5,8-maleic acid monoalkyl ester adduct 9-hydroxy lactones, such as 9-hydroxy-5,7-pregnadien-3,11,20-trione 5,8-maleic acid monoethyl ester adduct 9-hydroxy lactone, 9-hydroxy-5,7-pregnadien-3,11,20-trione 5,8-maleic acid monopropyl ester adduct 9-hydroxy lactone, 9-hydroxy-5,7-pregnadien-3,11,20-trione 5,8-maleic acid monoisopropyl ester adduct 9-hydroxy lactone, 9-hydroxy-5,7-pregnadien-3,11,20-trione 5,8-maleic acid monobutyl ester adduct 9-hydroxy lactone, 9-hydroxy-5,7-pregnadien-3,11,20-trione 5,8-maleic acid monoamyl ester adduct 9-hydroxy lactone, 9-hydroxy-5,7-pregnadien-3,11,20-trione 5,8-maleic acid monohexyl ester adduct 9-hydroxy lactone, 9-hydroxy-5,7-pregnadien-3,11,20-trione 5,8-maleic acid monoheptyl ester adduct 9-hydroxy lactone, 9-hydroxy-5,7-pregnadien-3,11,20-trione 5,8-maleic acid monooctyl ester adduct 9-hydroxy lactone, 9-hydroxy-5,7-pregnadien-3,11,20-trione 5,8-maleic acid monobenzyl ester adduct 9-hydroxy lactone, and the like.

PREPARATION 21.—12-BROMO-5,7-PREGNADIEN-3,11,20-TRIONE 5,8-MALEIC ANHYDRIDE ADDUCT

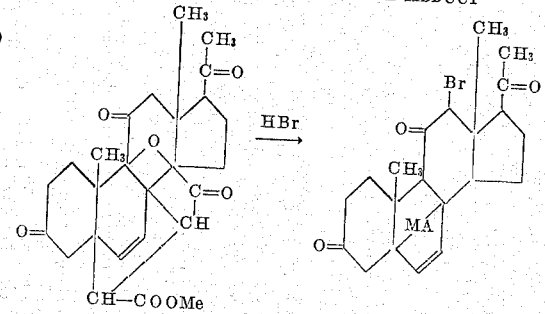

To a solution of 9-hydroxy-5,7-pregnadien-3,11,20-trione 5,8-maleic acid monomethyl ester 9-hydroxy lactone (Preparation 20) (2.0 grams, 0.044 mole) in twenty milliliters of chloroform (methanol free), was added twenty milliliters of acetic anhydride. This solution was placed in a Carius tube immersed in an acetone-Dry Ice bath and cooled to minus eighty degrees centigrade. Anhydrous hydrogen bromide was then introduced by means of glass tubing which extended to within a few inches of the surface of the liquid. The gas condensed on the sides of the Carius tube until a volume of 7.2 milliliters (20 grams) had been collected. The gas flow was then terminated and the end of the Carius tube sealed off while the tube was still in the acetone-Dry Ice mixture. The tube was then placed in an iron pipe and allowed to warm to room temperature, where it was maintained for twenty hours. At the end of this reaction time, the tube was again cooled in an acetone-Dry Ice bath, opened, and the contents poured on crushed ice. The tube was rinsed with chloroform and then with water. The washings were added to the reaction mixture and the resulting two layers shaken together and then separated. The water layer was washed with chloroform and the combined chloroform fractions washed with water until the washings were neutral to P-hydrion paper. The chloroform solution was then dried over anhydrous sodium sulfate, filtered, and the chloroform taken off under vacuum, leaving 2.4 grams of a light yellow solid. This solid was crystallized from an acetone-isopropyl ether mixture to give white needles, M. P. 190–192 degrees centigrade (block).

*Analysis:*
Calculated
C, percent 59.65; H, percent 5.41; Br, percent 15.87
Found
C, percent 59.57; H, percent 5.66; Br, percent 16.05
59.30;  5.43;  16.14

(alpha)$_D^{24}$—135 degrees (micro) (chloroform).

Use of the monoethyl, monopropyl, monoisopropyl, monobutyl, monoamyl, monohexyl, monoheptyl, monooctyl, monobenzyl, or like monoalkyl esters in place of the monomethyl ester starting material is productive of the same result, i. e., preparation of the desired 12-bromo-5,7-pregnadien-3,11,20-trione 5,8-maleic anhydride adduct.

PREPARATION 22.—12-BROMO-5,7-PREGNADIEN-3,11,20-TRIONE 5,8-MALEIC ACID ADDUCT

The procedure of the foregoing Preparation 21 is repeated exactly except that the mixture of reaction products is poured into a mixture of water and crushed ice, the mixture made slightly acidic by addition of dilute hydrochloric acid and refrigerated overnight to give crystals of 12-bromo-5,7-pregnadien-3,11,20-trione 5,8-maleic acid adduct.

The same compound is produced by dissolving the anhydride adduct of Preparation 21 in water, acidifying by addition of dilute hydrochloric acid, and refrigerating to precipitate the desired acid adduct.

PREPARATION 23.—12-BROMO-5,7-PREGNADIEN-3,11,20-TRIONE 5,8-DIMETHYL MALEATE ADDUCT

A suspension of the maleic acid adduct from Preparation 22 in fifty milliliters of dry ether was cooled in an ice-salt bath while a slight excess of diazomethane in methylene chloride was added slowly and with stirring. When addition was complete the solution was placed on a steam bath and concentrated to dryness. The residue was crystallized from an acetone-water mixture to give the desired 12-bromo-5,7-pregnadien-3,11,20-trione 5,8-dimethyl maleate adduct. Infra-red analysis was in accord with the structure proposed.

In the same manner as given above, other 5,8-dialkyl maleates, e. g., the diethyl, dipropyl, diisopropyl, dibutyl, diamyl, dioctyl, and dibenzyl maleates, of 12-bromo-5,7-pregnadien-3,11,20-trione are prepared from 12-bromo-5,7-pregnadien-3,11,20-trione 5,8-maleic acid or 5,8-maleic anhydride adducts and the appropriate diazoalkane, or by other equivalent esterification procedure.

Example 1.—5,7-pregnadien-3,11,20-trione 5,8-maleic anhydride adduct

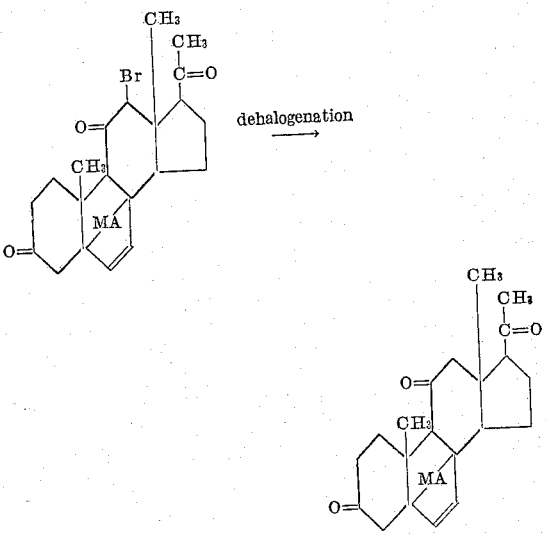

To a 100-milliliter round-bottom flask equipped with a reflux condenser was added a solution of 600 milligrams of 3,11,20-triketo-12-bromo-5,7-pregnadien-5,8-maleic anhydride adduct [12-bromo-5,7-pregnadien-3,11,20-trione 5,8-maleic anhydride adduct] (Preparation 21) in twenty milliliters of acetone together with five grams of Raney nickel which had previously been deactivated by refluxing in acetone for two hours. The mixture was heated at reflux for six hours. The nickel was filtered off and the acetone removed under vacuum. The residue was taken up in chloroform and washed with water. After drying over anhydrous sodium sulfate and filtering, the solvent was taken off under vacuum leaving 485 milligrams of a light yellow solid, the infra-red spectrum of which is in accord with the structure of 3,11,20-triketo-5,7-pregnadien-5,8-maleic anhydride adduct [5,7-pregnadien-3,11,20-trione 5,8-maleic anhydride adduct].

Example 2.—5,7-pregnadien-3,11,20-trione 5,8-maleic anhydride adduct

This compound was also prepared from the starting material of Example 1 by dehalogenating with zinc dust using acetic acid as the solvent. The reflux time was two hours after which time the reaction mixture was poured into ice and water. The water solution was extracted with methylene chloride. The extracts were washed with water until free of acid, dried, filtered, and the solvent taken off under vacuum, leaving 415 milligrams of a light brown solid which, according to infra-red data, was identical to the product isolated from the Raney nickel dehalogenation of Example 1.

Example 3.—5,7-pregnadien-3,11,20-trione 5,8-maleic acid adduct

The anhydride adduct from Example 1 is dissolved in water, acidified with dilute hydrochloric acid, and refrigerated overnight to yield crystals of the desired 5,7-pregnadien-3,11,20-trion 5,8-maleic acid. This compound is also obtained by following the procedure of Example 1 or Example 2, using as starting material instead of the 12-bromo-5,1-pregnadien-3,11,20-trione 5,8-maleic anhydride adduct the 12-bromo-5,7-pregnadien-3,11,20-trione 5,8-maleic acid adduct of Preparation 22.

Example 4.—5,7-pregnadien-3,11,20-trione 5,8-dimethyl maleate adduct

A suspension of the maleic acid adduct from Example 3 in fifty milliliters of dry ether was cooled in an ice-salt bath while a slight excess of diazomethane was added slowly thereto with stirring. When addition was complete, the solution was placed on a steam bath and concentrated to dryness. The residue was crystallized from an acetone-water mixture to give the desired 5,7-pregnadien-3,11,20-trione 5,8-dimethyl maleate adduct. Infra-red analysis is in accord with the proposed structure.

In the same manner as given above, other 5,8-dialkyl maleates, e. g., the diethyl, dipropyl, di-isopropyl, dibutyl, diamyl, dioctyl, and dibenzyl maleates, of 5,7-pregnadien-3,11,20-trione are prepared from 5,7-pregnadien-33,11,20-trione 5,8-maleic acid or 5,8-maleic anhydride adducts and the appropriate diazoalkane, or by other equavalent esterification procedure. These compounds are also prepared by following the procedure of Example 1 or Example 2 exactly using instead of the 5,7-pregnadien-3,11,20-trion 5,8-maleic anhydride starting material, a selected 5,7-pregnadien-3,11,20-trione 5,8-dialkyl maleate, prepared according to the manner of Preparation 23.

Example 5.—5,7-pregnadien-3,11,20-trione 5,8-maleic anhydride adduct

The procedure of Example 1 is repeated, using instead of the deactivated Raney nickel and acetone solution, sodium iodide in ethyl alcohol. After working up the reaction product as in Example 1, the desired 5,7-pregnadien-3,11,20-trion 5,8-maleic anhydride adduct is obtained as a light brown solid.

Example 6.—5,7-pregnadien-3,11,20-trione 5,8-maleic anhydride adduct

This compound is also obtained by following the procedure of Example 2, using zinc dust in acetamide solution rather than zinc dust in acetic acid and heating at a temperature of about 100 degrees centigrade with stirring.

Example 7.—5,7-pregnadien-3,11,20-trione 5,8-maleic anhydride adduct

This compound is also obtained by following the procedure of Example 2 exactly, using magnesium dust in acetic acid instead of zinc dust in acetic acid.

Pyrolysis of 5,7-pregnadien-3,11,20-trione 5,8-maleic anhydride adduct in a high-boiling solvent, as, for example, in terpineol, removes the maleic anhydride adduct, as indicated below, to give a mixture of 4,8-pregnadien-3,11,20-trione and 4,7-pregnadien-3,11,20-trione.

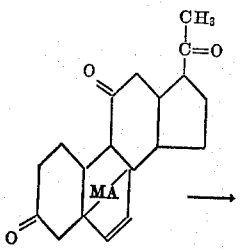

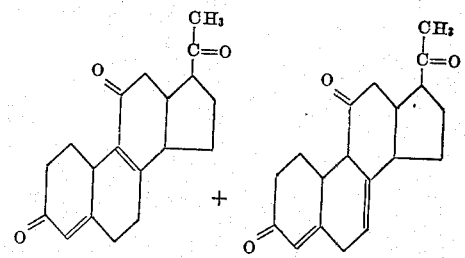

Hydrogenation of the 4,8-pregnadien-3,11,20-trione and the 4,7-pregnadien-3,11,20-trione, separately, or as a mixture, using hydrogen and a palladium catalyst, gives a mixture of pregnane-3,11,20-trione and allopregnane-3,11,20-trione, both of which compounds are known in the art.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1. A 5,7-pregnadien-3,11,20-trione 5,8-maleic adduct of the formula:

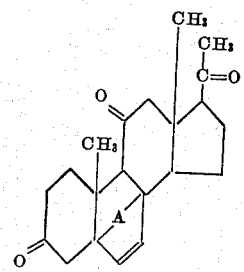

wherein A is the adduct radical of a dienophile selected from the group consisting of maleic acid, maleic anhydride, and lower-alkyl diesters of maleic acid containing from one to eight carbon atoms, inclusive, in the esterifying groups.

2. 5,7-pregnadien-3,11,20-trione 5,8-maleic anhydride adduct.

PAUL E. MARLATT.
ARTHUR R. HANZE.
A VERN McINTOSH, Jr.
ROBERT H. LEVIN.

References Cited in the file of this patent

UNITED STATES PATENTS

| Number | Name | Date |
|---|---|---|
| 2,447,325 | Gallagher | Aug. 17, 1948 |
| 2,541,074 | Kendall | Feb. 13, 1951 |

OTHER REFERENCES

Turner, Jour. Biol. Chem. 166, pp. 345–365 (1936).